United States Patent [19]

Kirstein

[11] Patent Number: 4,962,680
[45] Date of Patent: Oct. 16, 1990

[54] ELECTRONIC CONTROL DEVICE FOR A DRIVE SYSTEM

[75] Inventor: Gerhard Kirstein, Augsburg, Fed. Rep. of Germany

[73] Assignee: Renk Aktiengesellschaft, Augsburg, Fed. Rep. of Germany

[21] Appl. No.: 358,931

[22] Filed: May 26, 1989

[30] Foreign Application Priority Data

May 27, 1988 [DE] Fed. Rep. of Germany ....... 3818007

[51] Int. Cl.$^5$ .............................................. B60K 41/06
[52] U.S. Cl. ........................................ 74/866; 74/878; 364/431.11
[58] Field of Search ................. 74/843, 856, 861, 866, 74/878; 364/431.11

[56] References Cited

U.S. PATENT DOCUMENTS

| 4,245,315 | 1/1981 | Barman et al. | 364/431.11 |
| 4,532,594 | 7/1985 | Hosaka et al. | 364/431.11 |
| 4,628,772 | 12/1986 | Nishikawa et al. | 74/866 |
| 4,748,566 | 5/1988 | Sasaki et al. | 364/431.11 |
| 4,788,890 | 12/1988 | Anderson | 74/866 X |
| 4,843,557 | 6/1989 | Ina et al. | 364/431.11 |

FOREIGN PATENT DOCUMENTS

| 0228899 | 7/1987 | European Pat. Off. |
| 3227460 | 2/1983 | Fed. Rep. of Germany |
| 3440847 | 5/1985 | Fed. Rep. of Germany |

OTHER PUBLICATIONS

Abstract of Japanese Patent No. 60-91050 dated 10/24/83.

Primary Examiner—Dwight Diehl
Attorney, Agent, or Firm—Darby & Darby

[57] ABSTRACT

An engine (4) of a drive system (2) is adjusted and controlled by a main controller (24). When the main controller (24) breaks down, the operation of the engine can still be continued as emergency operation with an emergency controller (26). However, the controlling functions of the latter are not as optimum as those of the main controller (24). This functional deficiency of the emergency controller (26) is compensated for at least partly by an emergency program of an electronic transmission control device (28). To compensate for the functional deficiency of the emergency controller (26), the transmission control device (28) appropriately controls or regulates a transmission unit (6, 8, 10) of the drive system (2), which comprises a hydrodynamic torque converter (8) with a bridging clutch (10) that can bridge the latter, and a gear-shift mechanism (6).

5 Claims, 1 Drawing Sheet

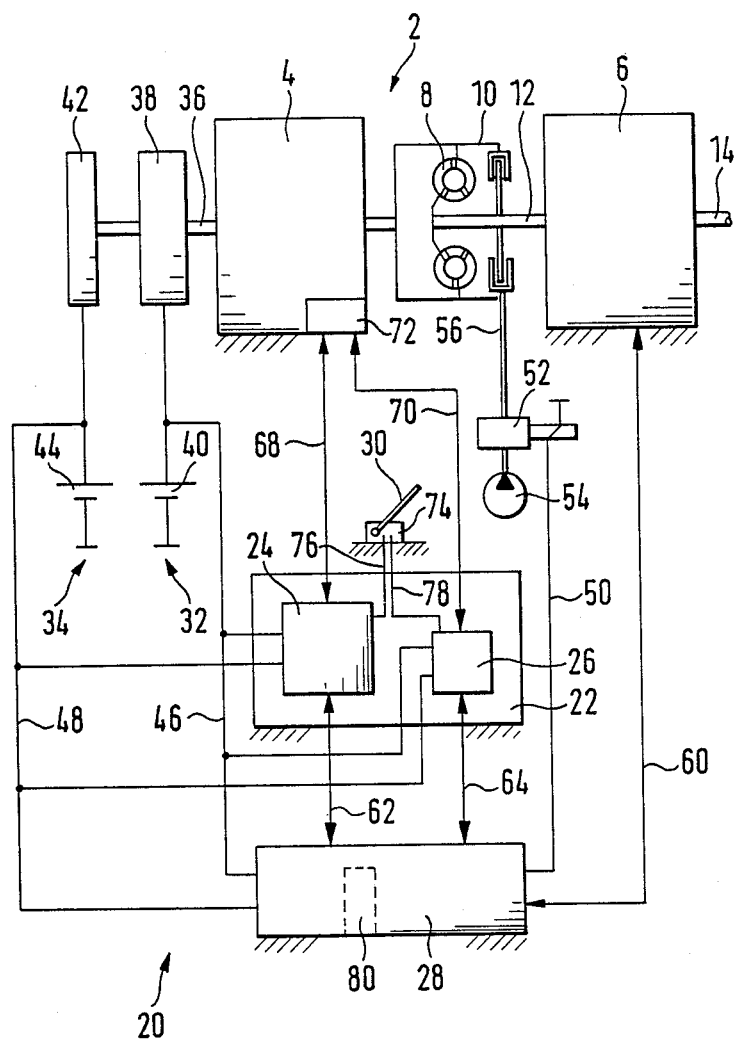

ELECTRONIC CONTROL DEVICE FOR A DRIVE SYSTEM

PRIORITY INFORMATION

Priority is claimed herein based upon Federal Republic of Germany Patent Application No. P 38 18 007.3, filed May 27, 1988, the entirety of which is incorporated herein by reference.

FIELD OF THE INVENTION

The invention relates to an electronic control device for a drive system. More specifically, the invention relates to a control device for controlling a transmission unit, the transmission unit having both normal and emergency operating modes.

DESCRIPTION OF THE TECHNICAL ART

A control system for controlling a drive system is described in German Offenlegungsschrift No. 3,313,688, corresponding to U.S. Pat. No. 4,653,003. The entire disclosure of U.S. Pat. No. 4,653,003 is expressly incorporated herein by reference. The known control device monitors rotating parts of the drive system not only when the parts are rotating, but also when these rotatable parts are at rest. In this way, faults can be detected even before the drive system is put in operation. When the control device detects a defect in the drive system, it switches over from a main program to an emergency program. Thus, depending on the type of fault, the drive system can then be operated with the emergency program instead of with the main program.

The object of the present invention is completely different. In drive systems for combat vehicles, the diesel engine of the drive system is controlled through a main controller as a function of the gas pedal and, simultaneously, as a function of other engine parameters such as, for example, the rotational speed, the torque, the supercharger air and the temperature. Moreover, an emergency controller is provided, which automatically takes over control of the engine when the main controller fails.

The emergency controller contains only the elements required for emergency operation with limited function. With the emergency controller, the vehicle can be driven only within a certain speed range, and greater deviations of the control from a desired value occur with the emergency controller. As a result, differences in the driving speed occur even when the driver keeps the gas pedal in a constant position. Thus the driver has problems with driving the vehicle at a constant speed. During emergency operation with the emergency controller, it is no longer possible to use all the gears of the gear change mechanism of the drive system, but only one or a few of the lower gears. This greatly reduces the driving comfort for the driver of the vehicle during emergency operation relative to standard operation with the main controller. Also, the emergency controller causes more fuel to be consumed than does the main controller.

SUMMARY OF THE INVENTION

It is an object of the invention to achieve approximately the same driving comfort during emergency operation with the emergency controller as during main operation with the main controller. Further, the invention is intended to reduce fuel consumption during emergency operation and to expand the speed range possible during emergency operation.

Pursuant to the invention, the objective is accomplished by providing a transmission control device and emergency program therefor which are matched to the particular functional deficiency of the engine control device emergency controller. The transmission control emergency program is activated when the engine control device emergency controller is activated.

Further pursuant to the invention, the emergency program of the transmission control device opens a bridging clutch on a hydrodynamic torque converter and keeps it in an open condition when the engine control device emergency controller is activated.

The invention is described in more detail below with reference to the attached drawing.

DESCRIPTION OF THE DRAWING

The drawing shows a schematic representation of a preferred embodiment of an electronic control device for a drive system according to the invention.

DETAILED DESCRIPTION

The drive system 2, which is shown in the drawing, comprises an internal combustion engine 4, preferably a diesel engine, a gear-shift mechanism 6 that can be shifted under load, a hydrodynamic torque converter 8 connecting the two, with a bridging clutch 10, by means of which the torque converter 8 can be bridged. The gear-shift mechanism 6 has an input shaft 12, which connects it with the torque converter 8, and an output shaft 14 to drive a vehicle element (not shown), for example, chain wheels to drive the chains of a tracked vehicle, especially a tank, or the wheels of a wheel-type vehicle, or the propeller of a ship.

The electronic control device 20 for the drive system 2 comprises an engine control device 22, with a main controller 24 and an emergency controller 26, as well as a transmission control device 28, a speed adjuster 30 in the form of a gas pedal, a main electrical network 32, and an emergency electrical network 34. The main electrical network 32 has a main generator 38, which is driven by an engine shaft 36, and at least one battery or accumulator 40. The main electrical network 32 provides electrical energy to all electrical elements of the vehicle, such as ignition system, interior and exterior lights, ventilation, military equipment, etc.

The emergency electrical network 34 has an emergency generator 42, which is also driven by the engine shaft 36, and at least one battery or accumulator 44. The emergency electrical network 34 provides electrical energy to only those electrical elements and devices of the vehicle which are necessary to drive the vehicle. Both the main electrical network 32 and the emergency electrical network 34 are connected through the electrical conductors 46 and 48 to the transmission control device 28, to the main controller 24, and to the emergency controller 26 of the engine control device 22.

The two electrical networks 32 and 34 are not used simultaneously. Rather, during normal operation, only the main electrical network 32 is used, and, if the main electrical network 32 breaks down, the system automatically switches over to the emergency electrical network 34. The switch-over is accomplished in the transmission control device 28 and in the engine control device 22 independently of one another, depending on whether the main electrical network 32 has failed as a whole or only with the one or the other device 28 and/or 22.

The transmission control device 28 controls not only the gear-shifting processes of the gear-shift mechanism 6 but also causes the bridging clutch 10 to couple in and out. For this purpose, the electronic transmission control circuit 28 controls an actuator 52 over an electrical line 50. As a function of an electrical control signal from the control device 28 on the electrical line 50, the actuator 52 controls the oil supply from an oil source 54 over a pipeline 56 to the bridging clutch 10 and thus either opens or closes the bridging clutch 10.

The electronic transmission control device 28 is connected via electrical conductors 60, 62, and 64, in this sequence, with the gear-shift mechanism 6, the main controller 24, and the emergency controller 26 of the electronic engine control device 22. The arrows on these conductors indicate that signals are transmitted in both directions on them. The main controller 24 and the emergency controller 26 are furthermore connected, through the electrical conductors 68 and 70, with the controlling and/or information-providing elements 72 of the engine 4, for bi-directional exchange of signals. The gas pedal 30 is provided with position indicator 74, which, depending on the current position of the gas pedal 30, transmits signals to the main controller 24 via an electrical conductor 76 and to the emergency controller 26 via an electrical conductor 78.

The transmission control mechanism 28 contains a microprocessor 80, which is indicated schematically in the drawing, and a main program to control the gear-shift mechanism 6 and the bridging clutch 10 during standard operation, as well as an emergency program to control the gear-shift mechanism 6 and the bridging clutch 10 during emergency operation.

The main controller 24 and the emergency controller 26 of the engine control device 22 are used to adjust and regulate the engine 4 as a function of the current setting of the speed adjuster or the gas pedal 30 and as a function of other operating data such as the rotational speed, the torque, the supercharger air and the temperature of the engine 4, and as a function or the operating data of the gear-shift mechanism 6, of the hydrodynamic torque converter 8, and of the bridging clutch 10, such as their input and output rotational speeds, torques and temperatures. The main controller 24 controls the engine according to various functional relationships stored therein, e.g., the relationships between engine speed and torque, engine speed and fuel consumption, engine speed and soot generating, engine speed and boost pressure, etc., as is conventional.

The emergency controller 26 does not operate simultaneously with the main controller 24, but is automatically switched on only if the main controller 24 breaks down. It then thereby takes over the control tasks of the main controller 24. The functional switching between normal and emergency operation modes is accomplished by a conventional failure detecting circuit (now shown) which is part of the transmission control unit 28. Transmission control units including such failure detecting circuitry are described in, for example, U.S. Pat. No. 4,653,003 and U.S. Pat. No. 4,661,772, both of which are expressly incorporated herein by reference. An electrical control for automatic transmissions is also described in U.S. Pat. No. 3,448,640, the entirety of which is also expressly incorporated herein by reference.

The auxiliary controller 26 is designed "more cheaply" than the main controller 24, that is, simpler and with fewer components, and thus has a functional deficiency compared with the main controller 24. Generally, the emergency controller 26 employs fewer functional relationships than the main controller 24. This functional deficiency may result in the appearance of severe and changing deviations in the set driving speed when operating with the emergency controller 26, even if the gas pedal 30 is held at a constant position. Thus it is difficult for the driver of a vehicle with such equipment to maintain a constant driving speed.

Another functional deficiency may consist therein that the engine can now be used only within a reduced speed range and the gear-shift mechanism 6 can now use only a reduced number of gears. A further functional deficiency may consist therein that the emergency controller 26 is not optimized with respect to the minimum fuel consumption by the engine 4. This is a functional disadvantage for the drive system 2, unless these functional disadvantages are compensated for otherwise.

Pursuant to the invention, this compensation is effected owing to the fact that the transmission control mechanism 28 and its emergency program are matched to the functional deficiency of the emergency controller 26 in such a fashion, that the functional disadvantage of the drive system 2, which results from the functional deficiency, is eliminated again at least partly. For this purpose, the engine control device 22 and the transmission control device 28 are electrically connected with one another in such a fashion that the emergency program of the transmission control unit 28 is also switched on automatically when the emergency controller 26 is switched on. In this way, the functional deficiency of the emergency controller 26 can be compensated for at least partially. This compensation by the emergency program of the electronic transmission control device 28 is significantly less expensive than the use of two main controllers 24 instead of a main controller 24 and an emergency controller 26.

The electronic transmission control device 28 and its emergency program are designed so that the transmission control device 28, acting through the activation element 52, automatically opens the bridging clutch 10 and keeps it in the opened state, when the emergency controller 26 and the emergency program are switched on. The emergency program is preferably designed so that the bridging clutch 10 is also closed during emergency operation, but only if and as long as the rotational speed of the engine 4 and of the transmission 6 exceed a minimum value. In this way the bridging clutch 10 can be closed when driving at a higher speed during emergency operation. This results in higher efficiency and conserves fuel. At high driving speeds, control fluctuations of the emergency controller 26 no longer affect driving comfort as severely as at low vehicle speeds.

The most important function of the emergency program is the above-mentioned opening of the bridging clutch. The emergency program preferably can control the gear-shift mechanism 6 during an emergency operation, as follows:

All gears are shifted automatically as a function of the vehicle speed, the vehicle acceleration, and the position of the gas pedal with the bridging clutch open.

A preferred embodiment consists therein that the transmission unit 6, 8, 10 is a driving and steering mechanism for a tracked vehicle, especially a tank, and that the emergency program is designed so that a defect in the transmission unit has priority over eliminating the functional deficiency, so that the emergency program always closes the bridging clutch during emergency operation and keeps it in the closed state, that is in the engaged state, whenever there is a deficiency in the steering section of the transmission unit. A driving and steering mechanism for tracked vehicles to which the invention may be applied is known, for instance, from the German Patent No. 3,636,153.

The invention is limited only by the claims.

I claim:

1. An electronic control device for a drive system having an engine, a transmission selectably connected to be driven by said engine, and said transmission including a hydrodynamic torque converter, a bridging clutch for selectably bridging the hydrodynamic torque converter, and an automatic gear-shift mechanism for coupling the engine to a drive system output shaft, the electronic control device comprising:

an electronic transmission control means for controlling the transmission, the electronic transmission control means further comprising a main program means for controlling the transmission during normal operation and an emergency program means for controlling the transmission unit during emergency operation;

an electronic engine control means for controlling the engine, the electronic engine control means further comprising a main controller means and an emergency controller for adjusting and controlling hte engine as a function of a setting of a speed adjuster and also as a function of other operating data, including engine rotatinal speed, torque, supercharger air, and temperature of the drive system, such that the emergency controller is activated automatically only if the main controller fails;

wherein the emergency controller has a functional deficiency causing a functial disadvantage in the driving system with respect to the main controller;

wherein the electronic transmission control means and the emergency program means are matched to the functional deficiency of the emergencycontroller so that the functional disadvantage is eliminated at least in part; and wherein further the electronic engine control means and the electronic transmission control means are electrically connected with one another so that the emergency program means of the electronic transmission control means is automatically activated when the emergency controller is activated; and wherein the electronic transmissin control means opens the bridging clutch through an activation element connected thereto and keeps the bridging clutch in an open state when the emergency program means and the emergency controller means are activated.

2. The electronic control device of claim 1, wherein the emergency program means of the electronic transmission control means closes the bridging clutch when the emergency program means and the emergency controller means area activated, if and as long as the rotational speed of the engine and of the transmission have a predetermined minimum value.

3. The electronic control device of claim 2, further comprising a main electrical network and an emergency electrical network, both of which are electrically connected in parallel with the main controller means as well as the the emergency controller means and the electronic transmission control means.

4. The electronic control device of claim 3, wherein the main electrical network include at least one main battery and one main generator connected to be selectably driven by the engine, and the emergency electrical network includes at least one emergency battery and one emergency generator, connected to be selectably driven by the engine.

5. The electronic control device of claim 4, wherein the emergency program means includes means for establishing priority of a defect in the transmission over elimination of the functional disadvantage, so that the emergency program emasn always closes and keeps closed the bridging clutch whenever there is a defect in the transmission.

* * * * *